United States Patent
Fauconnier

(10) Patent No.: US 7,184,776 B2
(45) Date of Patent: Feb. 27, 2007

(54) TECHNIQUE FOR NOTIFICATION OF MOBILE TERMINALS BY GEOGRAPHICAL CO-ORDINATES

(75) Inventor: Denis Fauconnier, St. Rémy les Chevreuses (FR)

(73) Assignee: Nortel Networks Limited, St. Laurent (CA)

( * ) Notice: Subject to any disclaimer, the term of this patent is extended or adjusted under 35 U.S.C. 154(b) by 112 days.

(21) Appl. No.: 10/168,708

(22) PCT Filed: Oct. 19, 2001

(86) PCT No.: PCT/EP01/12415

§ 371 (c)(1),
(2), (4) Date: Jun. 19, 2002

(87) PCT Pub. No.: WO02/34001

PCT Pub. Date: Apr. 25, 2002

(65) Prior Publication Data

US 2002/0183075 A1  Dec. 5, 2002

(30) Foreign Application Priority Data

Oct. 20, 2000  (EP)  ............................... 00402920

(51) Int. Cl.
*H04Q 7/20*  (2006.01)
*G01S 3/02*  (2006.01)
(52) U.S. Cl. .................... 455/456; 342/457
(58) Field of Classification Search ........... 455/456; 342/457
See application file for complete search history.

(56) References Cited

U.S. PATENT DOCUMENTS 6,236,365 B1 *  5/2001  LeBlanc et al. ............ 342/457

FOREIGN PATENT DOCUMENTS

| EP | 0889657 A2 | 1/1999 |
| EP | 0998 159 A1 | 5/2000 |
| WO | WO 95/52376 A1 | 11/1998 |
| WO | WO 00/30379 A1 | 5/2000 |

OTHER PUBLICATIONS

Mouly "The GSM system for mobile communications", pp. 366-384, 1992.
Reed, "An Overview of the Challenges and Progress in Meeting the E-911 Requirement for Location Service", IEEE Communications Magazine, vol. 36, No. 4, Apr. 1, 1998, pp. 30-37.

* cited by examiner

*Primary Examiner*—William D. Cumming
(74) *Attorney, Agent, or Firm*—Barnes & Thornburg LLP

(57) ABSTRACT

A base station transmitter and a method of operating the same for use in a wireless telecommunications network are described. The transmitter is used for transmitting messages to at least one user equipment, the transmitter being adapted to transmit a paging request on a paging channel to page a user equipment. The message includes a representation from which the paged user equipment can determine whether its present position is within a geographical area. By using geographical coordinates the user equipment can deny paging requests which are of no local interest.

11 Claims, 4 Drawing Sheets

TECHNIQUE FOR NOTIFICATION OF MOBILE TERMINALS BY GEOGRAPHICAL CO-ORDINATES

The present invention relates to wireless communication systems such as Public Mobile Radio (PMR) and Cellular Telephone systems as well as wireless notification or paging systems and satellite communications systems and to methods of operation thereof.

TECHNICAL BACKGROUND

In wireless systems, paging is used when the network needs to contact a user terminal (UE) which is not currently communicating with the network or cannot communicate with the network—e.g. in a system using pagers having no communication possibility. For example, in wireless cellular telephone systems a UE is paged when it has gone into a mode where it uses discontinuous reception. There are generally two advantages associated with the use of paging for wireless cellular telephone systems:

It allows a mobile UE to move within a list of cells, typically within a Location Area, or from one radio coverage area to another without informing the network. This reduces the signalling traffic between UE's and the network which only deals with the position of the UE.

It allows a mobile UE in a particular cell or radio coverage area to use a reduced duty cycle when idle by only monitoring a paging channel, therefore reducing battery consumption.

The objective of paging is typically to contact the UE and to transfer a message. The message may include an implicit or explicit request for the UE to contact the network by sending a random access request on an access channel. In this way, communications can be set up between a mobile UE and the network.

Paging can be used towards individual UE's or to groups of UE's, typically as a notification channel in case of activity on a group call. In all these cases, paging is based on addressing, for example, a group address, a fleet address, an individual address, a set of individual addresses or addresses within a certain range or address segment. Either temporary of permanent addresses can be used.

Generally, the purpose of the paging is also indicated to the terminal e.g. for a mobile UE terminated phone call, a mobile terminated Short Message (SMS), an alpha-numeric message to be displayed on a pager.

Positioning or location techniques based on radio signal measurements in support of Location based services (LCS) are known for wireless cellular telecommunications systems, for example from the standard 3G TS 25.305 version 3.1.0 release 1999 "Functional Specification of Location Services". A general description of location services and the service requirements is given in the specification 3G TS 22.071. Generally there are four categories of usage of the location service:

Commercial LCS (or Value Added Services);
Internal LCS (within the network);
Emergency LCS;
Lawful Intercept LCS.

Two basic techniques are used for determining the location of mobile user equipment:

a Mobile based, where the mobile UE can autonomously (e.g. using a Global Positioning System (GPS) receiver) or with the support of the network (through broadcast of information) calculates its position and transmits it to the network.

Network based, where the mobile UE reports measurements of radio signals and the network can perform the calculation of the mobile UE's position.

By measuring radio signals the capability to determine the geographic location of the user equipment (UE) can be provided. Locating the UE involves two main steps:

signal measurements; and
location estimate computation based on the measurements.

The signal measurements may be made by the UE, a base station or a dedicated location measuring unit (LMU). The basic signals measured are typically radio transmissions, but some optional methods may make use of other transmissions such as general radio navigation signals. The location estimate computation may be made in the UE or by a calculation function located in the network. The location information may be requested by and reported to a client (application) associated with the UE, or by a client within or attached to the network. The location information may also be utilised internally within the network, for example, for location assisted handover or to support other features such as home location billing. There are many different possible uses for the location information. The location feature may be used internally by the network (or attached networks), by value-added network services, by the UE itself or through the network, and by "third party" services. The feature may also be used by an emergency service (which may be mandated or "value-added"), but the location service is not exclusively for emergencies.

These systems rely on a calculation of the mobile terminal's position which is calculated or recorded in the network. This method brings security problems—it is not always the case that a mobile user wants to have the location of the mobile identified by any service wishing to know it. Further, it takes up network resources to store the location of these equipments.

Positioning or location techniques have also been envisaged as a trigger to handovers, and also as means to support network planning i.e. having the UE report means to determine its position along with radio measurements so that the quality of reception can be logged by the network for each position of the mobile.

One method of determining the location of a UE is known as the Cell ID based method. A geographical area for a wireless cellular communications system is generally divided into separate radio coverage areas or cells. Generally a base station is located in each cell and a mobile user equipment (UE) communicates with one or more base station transceivers located in one or more cells during an active call. Generally, from a paging and network organisation point of view, several cells may be grouped together and referred to as a location area. Generally, the location of a UE within a location area is not known precisely. If a UE leaves a location area it will normally register itself with the new location area via the cell in which it is currently located (Location Updating). Both location areas and base stations generally have an identifier (LAI, Location Area Identifier and BSI, Base Station Identifier) which are generally transmitted on a common signalling channel). Except under special circumstances, the network does not know the position of the UE any more accurately than this. Hence, if the network wishes to make contact with the UE it generally sends a paging request on a suitable (usually common) signalling channel starting with the cells of the last location area in which the relevant UE registered. Location updating causes updating of subscriber data of the UE in question in the subscriber database, typically in a VLR, Visitor Location Register associated with a Mobile Exchange (MSC). Hence, it can be stated that the location updating procedure stores a location of each UE accessing the system. This results in a great deal of data to be stored continuously and the need for signalling at each location update. As the location area is made smaller, the amount of signalling increases as UE's move from one location area to the next at a higher frequency. For this reason location areas are typically rather large, usually several cells in size. Such a large size does not allow services to be provided which depend upon paging UE's in smaller areas, say 200 to 2000 meters in diameter.

Known systems in which the position of a mobile UE is determined by the network based on information from the mobile UE have the disadvantage that, if a large geographical area is involved, the positions of a large number of mobile UE's must be stored and continuously updated. This poses impractical limitations on implementing such a system for anything less than large areas. An example of this type of system is described in WO94/07337 in which a Temporary Paging Area reference is stored in the subscriber database.

The present invention has as an object, the provision of a system and method for organising a wireless communications system which allows notifications of a single user equipment or a group of user equipments within a specified geographical area.

A further object of the present invention is the provision of a system and method for organising a wireless communications system which allows notification of a group of user equipments within a specified geographical area which can be selectable in size without having to store and update the locations of the mobile UE's within the area.

A further object of the present invention is the provision of a system and method for organising a wireless communications system which allows a user to decide on whether the location of the user equipment is made known to the network.

SUMMARY OF THE PRESENT INVENTION

The present invention provides a wireless telecommunications network comprising at least one transmitter and a plurality of user equipments able to receive radio messages from the at least one transmitter, the network being adapted to transmit a notification message to at least a sub-group of the user equipments, a first part of the message comprising a representation from which a user equipment can determine whether its present location is within a certain geographical area; and to read a second part of the message in accordance with the result of the determination.

The present invention provides a method of operating a wireless telecommunications network comprising at least one transmitter and a plurality of user equipments able to receive radio messages from the at least one transmitter, the method comprising:
transmitting a notification message to at least a sub-group of the user equipments, a first part of the message comprising a representation from which a user equipment can determine whether its present location is within a certain geographical area;
at least the sub-group of the user equipments receiving the message and determining whether their present location is within the geographical area; and
the sub-group of user equipments reading a second part of the message in accordance with the result of the determination.

The present invention also includes a mobile user equipment for use with a wireless telecommunications network comprising at least one transmitter, the user equipment comprising:
an antenna for receiving a notification message from the at least one transmitter, a first part of the message including a representation from which the user equipment can determine whether its present location is within a certain geographical area;
a means for determining whether the present location of the user equipment is within the geographical area; and a means for reading a second part of the message in response to the determination.

The present invention also provides a method of operating a mobile user equipment for use with a wireless telecommunications network comprising at least one transmitter, the method comprising the steps of:
receiving a message from the at least one transmitter, a first part of the message including a representation from which the user equipment can determine whether its present location is within a certain geographical area;
determining whether the location of the user equipment is within the geographical area; and
reading a second part of the message in response to the determination.

The present invention also provides a transmitter for use in a wireless telecommunications network for transmitting radio messages to at least one user equipment, the transmitter being adapted to transient a two-part notification message, a first part of the message including a representation from which a user equipment can determine whether its present position is within a geographical area and a second part containing information relevant to the geographical area.

The present invention also provides a method of operating a transmitter for use in a wireless telecommunications network for transmitting to at least one user equipment, the method comprising the steps of:
the transmitter transmitting a two-part notification message, a first part of the message including a representation from which the user equipment can determine whether its present position is within a geographical area and a second part containing information relevant to the geographical area.

The transmitter described above may be a base station transmitter used for conventional voice and data transmissions to user equipment. It may however, also be an independent transmitter which is specially used for transmitting notification messages according to the present invention. The representations included in the notification message are preferably time differences between transmissions from pairs of base stations of the system. Preferably, three time differences are included in the notification message thus providing a form of triangulation from which a user equipment can decide whether it is a defined geographical location without excessive computational effort.

The dependent claims define independent embodiments of the present invention. The present invention will now be described with reference to the following drawings.

DESCRIPTION OF THE PREFERRED EMBODIMENTS

Figure 1:
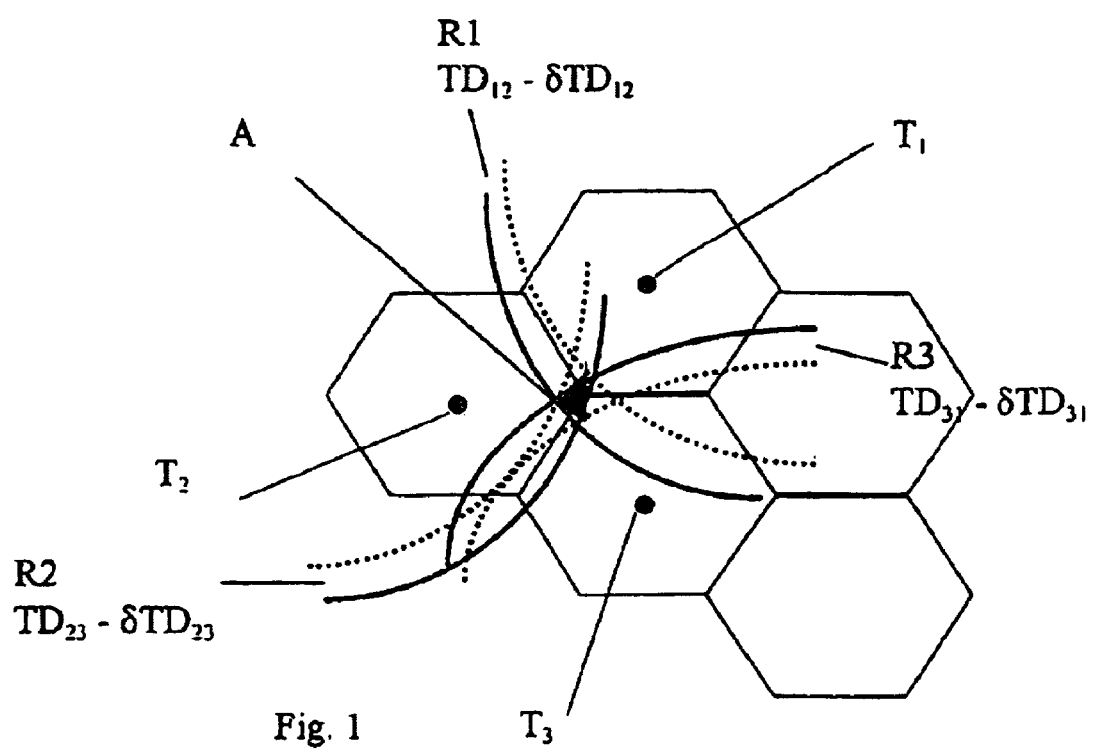
FIG. 1 is a schematic representation of a plurality of base station transmitters transmitting a paging message including a representation of the co-ordinates of a geographical region and the region defined thereby.

The present invention will be described with reference to certain embodiments and with reference to certain drawings but the present invention is not limited thereto but only by the claims. The drawings are schematic and non-limiting.

The present invention may be applied to wireless communication systems such as Public Mobile Radio (PMR) and Cellular Telephone systems as well as wireless paging systems and satellite communications systems and to methods of operation thereof. A pager generally has a pager receiver, an alphanumeric and/or audio and/or other visual display as well as an internal memory and a computing device such as a microprocessor. A cellular wireless system suitable for use with the present invention may be exemplified by the following non-limiting list: AMPS, IS95, GSM (Global System for Mobile Communications), NMT (Nordic Mobile Telephone), UMTS (Universal Mobile Telecommunication System) and any other system as described for instance in "Wideband CDMA for Third Generation Mobile Communications", Ojanperä and Prasad, Ailech house, 1998. Satellite systems are described for instance in "Satellite Communications Systems", G. Maral and M. Bousquet, Wiley, 1998. In the following, the present invention will mainly be described with reference to a cellular wireless communications system but the present invention is not limited thereto but only by the claims.

In one aspect of the present invention a method and related equipment is provided so that the network can notify all UE's or a sub-group of UE's based on their position (e.g. to notify all UE's within a certain area, this area not necessarily being the same area as a location area and preferably being a smaller area such as an area of less than 2,000–5,000 meters diameter) without having to store location details of a large number of UE's, e.g. without having to continuously store precise location details of all UE's. The UE's may be located in one or more cells. The UE may have complete control over whether its position is made known to the network.

An embodiment of the present invention includes the following method steps:

1. The network builds a notification message using any one of a variety of user equipment addresses including, but not limited to, a universal address which is recognised by all UE's, a group address, a fleet address, a set of individual addresses or addresses within a certain range or address segment. It could also be one address specific to the support of the positioning feature.
2. The network sends a notification message using the notification address. Within the complete notification message, means to identify a given geographical area are provided or means from which a user equipment can determine whether its present position is within a certain geographical area. Optionally a reason for notification may also be included as well as any other type of message, such as an alphanumeric message for the subscriber. Generally, every UE has to decode the paging channel and the notification message may be included in a paging request.
3. UE that receives this notification message determines if it is authorized to decode the message (for example, it belongs to the relevant group, fleet, address segment etc.) and then compares its position with the geographical area derivable from the notification message. The UE may receive and process the message independent of whether the UE is in idle mode or is actively communicating with the network. If the UE lies within the geographical area specified, the UE takes one of a variety of actions. For example, it may display a message on its own alphanumeric display, or execute an appropriate action, for example send a random access message to the network indicating the reason for access or sound an alarm or activate another piece of equipment such as boot up a lap-top computer to which the pager receiver is connected. Typically, the user equipment will be required to access the network so that the use of the service may be logged and billed. The information necessary contained in the notification message for determining the user terminal geographic location may be encrypted or ciphered. This allows the service to be provided on a billed basis and also allows secrecy to be kept.

Implicit in this method is the ability of the UE to determine its own position with reasonable accuracy. It may do this via an on-board GPS receiver or the network may assist in the self-location of the UE. Once, contacted, the network can then obtain from the user terminal a number of different types of information, such as signal strength received by the user terminal, reports of time differences between transmissions from different base stations, reports on snychronisation or other network information.

One preferred addressing method for notification is to use an address where every UE has to decode the associated paging channel. A structure of the paging channel could also be defined so that all UE's, whatever their paging group, are made aware that such a group paging has been made e.g. one bit on all paging messages could indicate that all terminals have to read a full cycle of paging messages.

A specific group paging address can also be associated with a given service e.g. paging addresses address certain service capabilities instead of a UE address. The notification message can be tagged in accordance with a specific service as well as containing geographical reference information. As an example, a specific paging reference or address can be allocated to a feature such as paging on location coordinates in accordance with the present invention. All UE's supporting such a feature would then be capable of recognisinig that reference or address and of decoding the contents of the paging message from which they can obtain the geographic data necessary to determine if the message is one relevant to that UE.

Apart from the paging group address, the paging message contains means to identify a geographical location, either a point location or an area. An example, is a geographical area which includes a shopping mall. Information relevant to that shopping mall may be selectively sent only to mobile terminals within the geographical area of the shopping mall. Several means are included within the scope of the present invention, of which the following is a non-limiting list:

A definition of one geographical area based on geographical co-ordinates. The UE would support mobile based position location methods in which the network provides information for the UE to locate itself autonomously. An example may the latitude and longitude of a point or a set of latitudes and longitudes which define an area, e.g. a set of three for a triangle, a set of four for a square oblong, parallelogram, or similar polygon. Alternatively, the latitude and longitude of a point is specified with an additional distance. The distance defines the radius of a circle having its centre as the specified point. Alternatively, a latitude and longitude is given and an offset from both the latitude and longitude. If the latitude and longitude of the UE both lie within the region defined by the latitude and longitude and the offsets thereof, the UE decodes the paging message.

A list of information on radio signal measurements, where the matching of the radio signal measurements made by the UE with these radio measurements would be the criterion for the UE to decode the paging message. The radio signal measurements would identify the relevant geographical area. Examples follow.

An advantageous means to identify a geographical area is a list of time intervals, e.g. propagation time delays or relative propagation time delays to identified base stations. The paging message would then include a set of time delays and a set of associated base stations (e.g. defined by base station identifiers). Where all the paged UE's are in one cell, one time interval may be representative of the relative propagation time difference to the base station of the current cell. Other time signals could be representative of propagation delays associated with a neighboring cell or cells with which the UE can make radio signal measurements. As each delay relates to a distance, a number of such delays from different base stations provides a triangulation system which can identify a point if the plurality of distances from the base stations all coincide at one point, or an area if they do not. A typical number of signal measurements required to provide adequate triangulation is 3 to be enough for a given reliability. Where a point is defined by the information in the paging message, a further distance may also be transmitted in the paging message, this distance defining a radius around the identified point in order to define a geographical area. The UE then compares its position with the identified pint and determines if its location lies within the circle defined by the point and the transmitted distance information as radius of the circle.

The above techniques involving latitudes, longitudes and distances can involve complex calculations such as sin, cosine, or square root functions. The use of look-up tables to define values of such functions is imprecise. A preferred embodiment of the present invention only involves comparisons of values and no calculations of trigonometric or complex algebraic functions. This may be achieved by the paging message including a set of time delays or differences as measured with respect to a set of base stations. Alternatively, the paging message may specify a range of time delays or differences which define the required area. This range may be defined by a % of the time delays or time differences, by an absolute tolerance or range of each time delay or difference or by any similar method. By default, a pre-defined % or absolute tolerance may be stored in the UE.

A time delay may determine a distance to a base station. A UE may determine the time delay to an identified base station by measuring the round trip time of a message from the UE to the respective base station and back. However, such a measurement requires the mobile terminal to be communicating with the system. An alternative is that the UE has a source of accurate time with which it can compare the arrival time of messages from a base station and from which it can calculate the time differences. Such an accurate clock may be provided by the network for UE's over the air interface or by other radio transmitted clocks.

More preferred is a reference in the notification message to relative transmission time differences between groups a of base stations pairs, i.e. the difference in time taken for a signal to travel from a first base station and a second base station to the UE. In either case, the time delay defines the locus of a point along which the specified time difference is true. By specifying two or more delays or time differences two or more loci are defined. Their point of intersection then defines the relevant geographical point. Preferably, the intersection of three such loci is used to define the geographical area. FIG. 1 is a schematic representation of a group of cells of a wireless telecommunications system with a base station transceiver at the centre of each cell. A notification signal is built in the Mobile Exchange MSC and broadcast from the three transmitters $T_1$, $T_2$, $T_3$. The message defines (in a first part of the message) three or more negative tolerances $\delta TD_{12}$, $\delta TD_{23}$, $\delta TD_{31}$ and three or more time differences $TD_{12}$, $TD_{23}$, $TD_{31}$, which are the time differences between transmissions from pairs of base stations 1 and 2, 2 and 3 and 3 and 1, respectively. These time differences are defined in certain standards, e.g. they are referred to as "Observed Time Differences" OTD in standard TS 25.305. These representations define regions $R_1$, $R_2$, $R_3$ with respect to the relevant transmitting base station pairs $T_{12}$, $T_{23}$, $T_{31}$. Where the three regions R1, R2, R3 overlap, a region A is defined. Hence, by giving the time differences $TD_{12}$, $TD_{23}$, $TD_{31}$ and a tolerance on each of these, $\delta TD_{12}$, $\delta TD_{23}$, $\delta TD_{31}$ the notification message includes representations from which the UE 1 can deduce whether or not it is in the region A.

The loci actually define a figure in three dimensions, a hyperboloid. For location service in three dimensions the hyperboloid must be considered. The geometry of the base station locations may affect the accuracy of the location estimate. The best results are when the base stations equally surround the UE. If they do not, there is a reduction in accuracy, which is sometimes termed the Geometric Dilution of Position (GDP).

Each UE 1 authorised to decode a first part of the paging message extracts the time difference information $TD_{12}$, $TD_{23}$, $TD_{31}$; $\delta TD_{12}$, $\delta TD_{23}$, $\delta TD_{31}$ and references to the base stations $T_1$, $T_2$, $T_3$ and compares actual time difference measurements for these base stations at the UE 1 with the transmitted values. If each measured time difference $MTD_{12}$, $MTD_{23}$, $MTD_{31}$ lies within the respective range $TD_{12}$ to $TD_{12}-\delta TD_{12}$, $TD_{23}$ to $TD_{23}-\delta TD_{23}$, $TD_{31}$ to $TD_{31}-\delta TD_{31}$, the UE 1 assumes it is within the specified geographical region A and decodes the rest of the notification message. Instead of providing a time difference TD and an offset $\delta TD$, two different time differences $TD^1$ and $TD^2$ could be transmitted whereby the difference between the two is the offset. In addition, a reference number, code or identification may be included in the notification message. This can be used to distinguish different notification messages with representations of co-ordinates relating to differing geographical areas in one cell. The UE's can reply to the network giving the reference code so that the network can identify which mobile UE's are answering to which notification message.

In order to calculate the representations which are to be included in the notification message, it is necessary to know:
the surveyed geographic locations of the base stations that have had their signals measured; and
the actual relative time difference (RTD) between the transmissions of the base stations (caused by offset, asynchronicity) at the time the notification message will be sent.

The accuracy of each of these measurements contributes to the overall accuracy of the location estimate. There are several approaches to determining the RTD. One is to snychronise the transmissions of the base stations. In this technique the RTD are known constant values that may be entered in a database and used when making a location estimate. The snychronisation must be done to a level of accuracy of the order of tens of nanoseconds (as 10 nanoseconds uncertainty contributes 3 metres error in the location estimate). Drift and jitter in the synchronization timing must also be well controlled as these also contribute uncertainty in the location estimate. Snychronisation to this level of accuracy is currently available through satellite based time-transfer techniques. The transmission times may all be aligned to a common reference in which case all RTD have a common value. However, in a more general case the transmissions may have a fixed offset with reference to the reference and thus the RTD values are non-zero and may be stored in the database.

It is preferable that the location methods do not require the base station network to be synchronized. The base stations may be left to free run within some constraint of maximum frequency error. In this case, the RTD will change (slowly) with time. The rate of change will depend on the frequency difference and jitter between base stations. If, for example, the maximum frequency difference between two base stations is $\pm 10^{-9}$, then the start of transmission of a 10 millisecond code sequence will drift through a cycle in about 1 390 hours (or 57 days). With this relatively slow rate of drift the RTD can be measured using fixed measuring units at known locations and stored in the database. The jitter and drift of the individual oscillators in each base station may cause the change of timing to slow, remain constant or reverse direction over time. Ongoing measurements of the RTD may be made to assure the most current values are available for the calculation function. The RTD measurement units may be co-located with the base stations or installed at other convenient locations in the coverage area, and report their results through network signalling channels.

If there are frequency differences between unsynchronised base stations, the RTD used in the calculations for the representations to be included in the notification message should be determined only a short time before the notification message is sent. In order to assure less than a 20 nanosecond uncertainty in the RTD value, the message must be sent within 10 seconds if the maximum frequency difference between the base stations is $\pm 10^{-9}$.

If the geographical area derivable from the notification message is large, the notification message in accordance with the present invention may trigger a large number of network accesses within a short time of transmitting the notification message. Such a large number may disturb the operation of the relevant cell or even block its operation for other users. In accordance with a further embodiment of the present invention, each mobile UE is adapted to delay reply to the notification message by a random time delay. By suitably dimensioning this delay, the access rush can be spread over a reasonable length of time, this avoiding blocking of the cell operation.

UE's supporting LCS in Idle mode may run the necessary set of radio signal measurements permanently so as to trigger applications on the internal memory of the UE (e.g. SIM memory) in need of such location information (mobile based positioning). For such UE's, these measurements would suffice.

Regarding other terminals, the need to perform prior and background radio signal measurements in support of the method in accordance with the present invention could be carried out permanently or only when indicated on a suitable common signalling channel transmitted from one or more base stations. Such a common signalling channel can be the beacon channel (BCCH) or pilot signal transmitted from each base station. Alternatively, such measurements need not necessarily be prepared in advance and be performed only on receipt of the notification message containing the distance or time information.

With respect to a network using Code Division Multiple Access (CDMA) on the air interface, a UE near its serving base station cannot hear other base stations on the same frequency. In order to determine accurately if the UE location is within the specified region, the UE terminal should be able to receive at least three base stations. To facilitate this sonic special means may be required. A solution for the above mentioned hearability problem is the IPDL (Idle Period DownLink) method. In this method each base station ceases its transmission for short periods of time (idle periods). During an idle period of a base station, terminals within the cell can measure other base stations and the hearability problem is reduced. Also, during idle periods real time difference measurements on the base stations can be carried out to determine any offsets or asynchronicity. Because the IPDL method is based on forward link (downlink) the location service can be provided efficiently to a large number of terminals simultaneously.

The Idle Periods may be arranged in a predetermined pseudo random fashion according to higher layer parameters. These parameters are used by the transport layer to arrange and use these Idle Periods. Idle Periods continuous mode or burst mode. In continuous mode the Idle Periods are active all the time. In burst mode the Idle Periods are arranged in bursts where each burst contains enough Idle Periods to allow a UE to make sufficient measurements for it to determine if it is in the specified location. The bursts are separated by a period where no Idle Periods occur.

The notification message in accordance with the present invention may be included in any suitable message. Thus, it may be included within normal paging messages. However, it may also be included within other messages. Cellular telephone systems often have a capability to address all UE's in a cell by means of a Cell Broadcast message. Such a service may also be used to broadcast the co-ordinates of the geographical area of interest in accordance with an embodiment of the present invention. UE's which identify that they are within the geographical area then take the appropriate action, e.g. activate an alarm, display a message or make contact with the base station of the cell. Generally, the UE will be required to contact the network so that the use of the service can be logged and billed. To allow user decision, the arrival of the notification message may be displayed on an alphanumeric display with a request if the user wishes to accept it (and hence incur charges). In order to avoid user disturbance when the notification message is sent repeatedly, the UE may be configured to ignore all notification messages with a specific reference number after the message has been rejected or accepted once. This ignoring of a notification message may be linked to a timer so that after a while the UE allows receipt of the message again.

Figure 2:
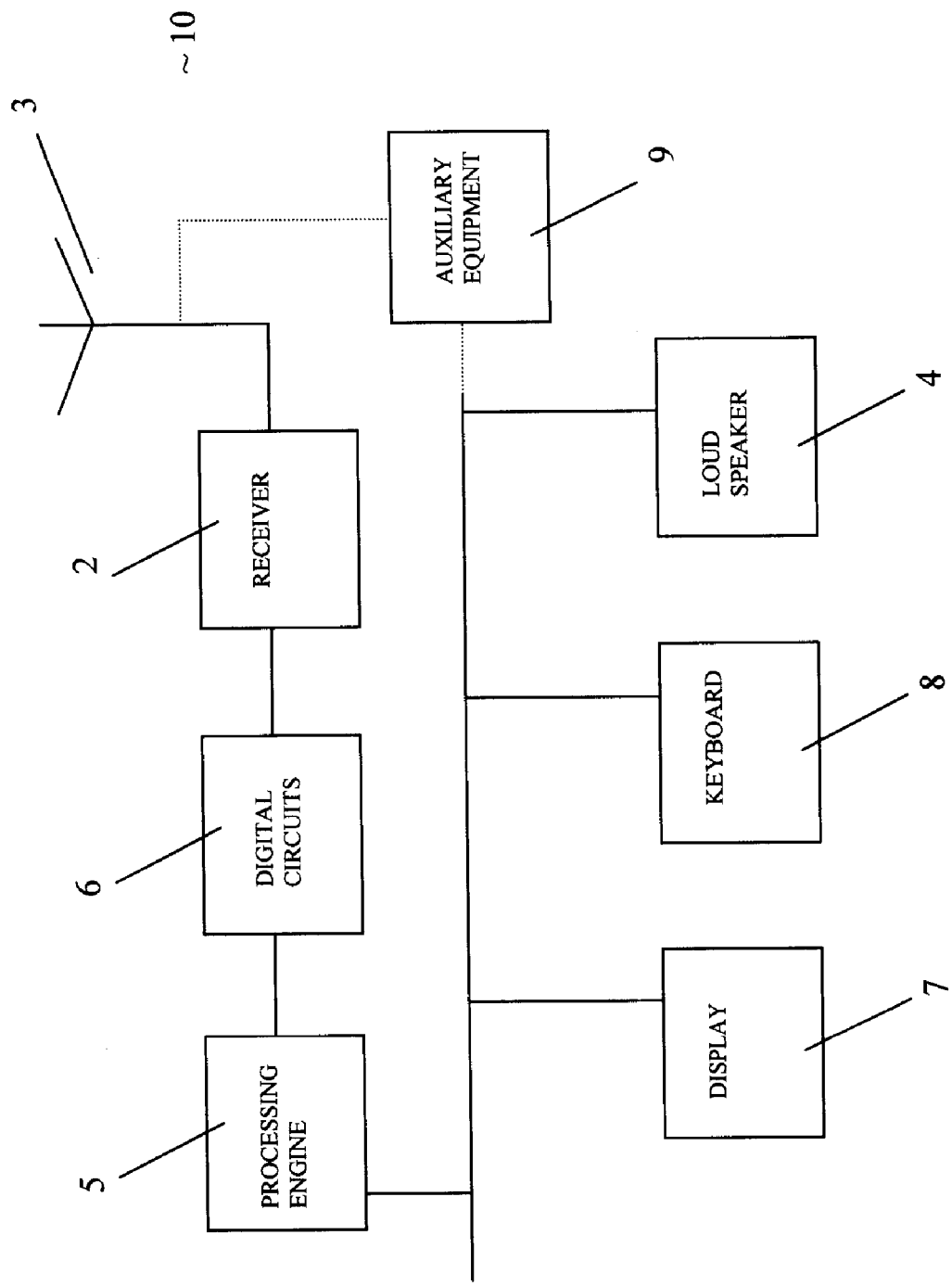
FIG. 2 is a schematic representation of a part of a user equipment in accordance with an embodiment of the present invention.

FIG. 2 shows a general block diagram of a receiver 10 of a user equipment (UE) 1 in accordance with an embodiment of the present invention. The UE 1 comprises a receiver 2 connected to an antenna 3. Operation of the UE 1 is controlled by a processing engine 5 such as a microprocessor. The receiver 2 may be connected to analog to digital circuits 6 for pre-processing a received analog radio signal from antenna 2 and outputting a digital signal to the processing engine 5. A user interface may optionally include a display 7 and optionally a keyboard 8 and may optionally be connected to loud speaker 4. Messages received by antenna 3 are delivered to the processing engine 5 via the analog to digital circuits 6 and receiver 2. Software programs may be run on processing engine 5 to carry out the methods of the invention described above.

Ancillary equipment 9 may be coupled to the processing engine 5 and/or the antenna 2. The ancillary equipment may be a transmitter and transmission circuitry of a mobile telephone to provide both receive and transmit functions under the control of the processing engine 5.

Figure 3:
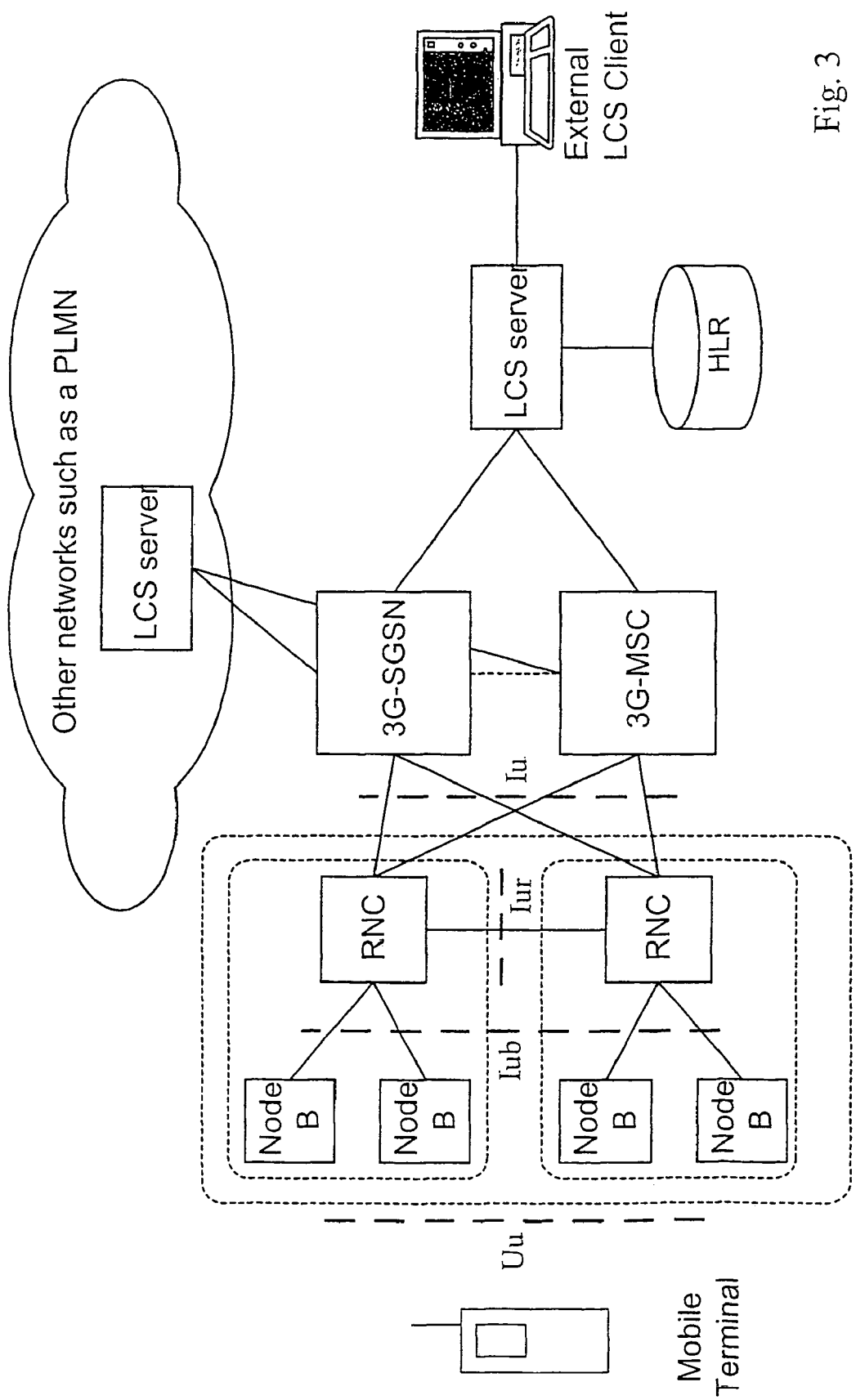
FIG. 3 is a schematic representation of a network with which the present invention may be used.

FIG. 3 is a schematic representation of a network with which the present invention may be used showing the general arrangement of the Location Service feature. This illustrates, generally, the relation or LCS Clients and servers in a network. The LCS entities such as servers 12, 14 and an LCS client 18 communicate with across various interfaces such as with a PLMN 20 with Mobile Switching Centres (MSC) 22 or Serving GPRS Support Node (SGSN) 24 and then over the Iu interface with other network elements such as Radio Node Controllers (RNC) 26, and the fixed transceiver sites (Node B) 28. As part of their service or operation, the LCS Clients may request whether User Equipments (UE) or mobile stations are within a certain geographical location. There may be more than one LCS client and these may be associated with the network, operated as part of a UE application or accessed by the UE through its access to an application (e.g. through the Internet). Typically the serving RNC, receives authenticated requests for LCS information from a network across the Iu interface. LCS entities then manage the network resources, including the Node-B's 28 (base stations), and the UE, to receive a list of UE's within the specified geographical area.

Upon request from the LCS entities or for internal network operations, the network will:
determine or calculate the representations which are to be sent in a notification message which will allow a User Equipment to decide if the UE is within the geographical area requested by the LCS or network internal entity;
transmit the notification message;
send the results as a list of the UE's which respond to the notification message to the LCS entities or to application entities within network.

Figure 4:
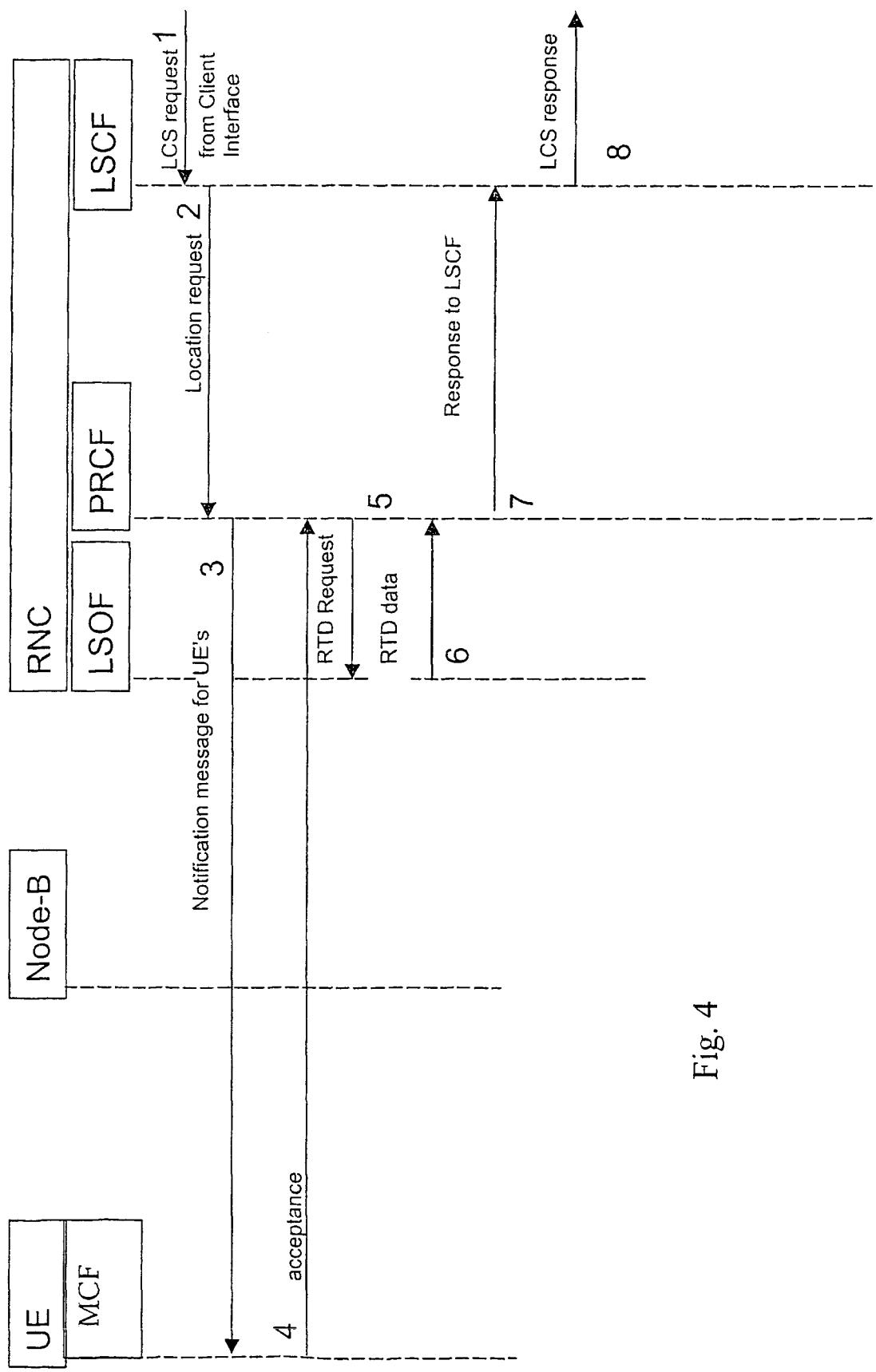
FIG. 4 is a message flow for LCS in accordance with an embodiment of the present invention.

A message flow is shown schematically in FIG. 4. The operation begins (1) with an authenticated request for location information about UE's from an application in the network being received at the network Location System Control Function (LSCF) in the serving RNC (SRNC). The LSCF acts as interface between the network and the LCS entities.
2. The LSCF considers the request and the capabilities of the UE and the network and forwards the request to the appropriate Position Radio Calculation Function (PRCF) in the Serving RNC.
3. The PRCF builds the representations required for the notification message and sends this to the UE's via the relevant Node-B.
4. The UE's receive the message and determine in a Mobile Calculating Function (MCF) whether they are in the requested region. The relevant UE's which wish to accept the notification return an acceptance to the PRCF.
5. The PRCF may request additional data about the associated transmitters to be used in the notification message from a Location Systems Operation Function (LSOF) database. Data necessary for the accurate calculation of the time differences to be used in the notification message (Real Time Differences, RTD) may depend on timing offsets and synchronicity between base stations and this data is stored in the LSOF database. This data may be stored locally to the RNC if they are constant over time, otherwise they can be updated to represent the RTD timing at the time-of-day the notification message will be sent.
6. The LSOF returns the timing data requested.
7. The PRCF sends the list of UE's to the LSCF.
8. The LSCF passes the list to the LCS client via the network.

The above scheme has considerable advantages in comparison with known techniques. It is not necessary to contact UE's individually. A cell broadcast or similar broadcast message may be sent to all UE's in a cell. Only the relevant UE's respond and a response also automatically includes an acceptance of the service which allows privacy of the user (by not accepting).

The skilled person will appreciate that there are various modifications to the above scheme all of which lie within the scope of the present invention. For use in the calculation of the representations in the notification messages, the relevant calculating function (PRCF) within the RNC may require additional information. This may be obtained by the function directly by communication with a database, as indicated above, or it may be through a request to LCS entities that will mediate the request and return of information from the appropriate database (or databases if more than one is needed to fulfil the requests). There may possibly also be available independent information that is able to supply the location information directly, or may be able to supply auxiliary information to the calculation function.

The utility of methods and apparatus in accordance with the present invention can be demonstrated in a variety of ways:
Network planning: the network can decide to optimise the network planning for a given area, and therefore requests terminals within that area to contact it so that the network can receive signal measurements from the terminal, along with the terminal information on its position.
Emergency calls: the network, on receipt of an emergency call from a mobile or stationary UE, can page all mobile UE's within the area where the calling user is, and collect from this the list of terminal identities (based on temporary identities such as TMSI or permanent identities such as IMSI) within that area. This could be useful in case of further investigation by the police so that witnesses may be sent to the scene of the emergency.
Fleet management, where there is a need to find the closest UE to a specific location e.g. to send a taxi, an ambulance, or a police car to a given location.
Precise warnings: where there is an emergency situation, e.g. a nuclear or chemical accident, UE's within a danger zone may be alerted. The users of these devices could alert others in the area not having mobile telephones or pagers.
Activation of devices: armaments (canons, mines, mortars), fireworks, alarms or other equipment could be activated remotely without having to address each device separately.

It is also possible to use the methods in accordance with the present invention to perform "permanent" paging, i.e. send in a Cell Broadcast message of a cell the coordinates ordinates of one area within the cell. On detection by the terminal that it has entered such an area, the terminal accesses the base station of cell to receive instructions.

It will be clear from the above that the network does not need to store data concerning the precise location of mobile users other than the information already stored for location of the user for conventional paging. Hence, services enabled by the present invention are provided without major changes to the amount of data stored by the network and without influencing the frequency of location updates. The user can decide at all times whether or not the location of his or her user equipment is made known to the network. This guarantees privacy, a problem with existing LCS systems.

While the present invention has been shown and described with reference to preferred embodiments, it will be understood by those skilled in the art that various changes or modifications in form and detail may be made without departing from the scope and spirit of this invention. For instance, in the methods described above the UE determines if it is within a certain specified area and takes action if it is. The UE may be adapted to take action in the inverse case, that is if it is not within the specified area and to take no action if it is within the specified area.

Also in the above reference has been made to base station transceivers of a cellular system transmitting the notification message. The present invention is not limited thereto. For instance, the notification message could be sent by special transmitters which are reserved for this purpose. These may be distributed more or less often than existing base stations or may be added as additional equipment at each base station.

In the above mention has been made of a UE measuring time differences between transmissions from base stations. Instead Positioning Elements (PE) may be located within the coverage area. PE's are placed in accurately known locations other than those of the Node B equipment. They synchronise to the downlink in a cell and transmit their symbols at predefined—or signalled—offsets with regard to the arrival of the beginning of a transmission from the base station of the cell, e.g. the beginning of the beacon or pilot frame at the PE location. Each PE may transmit a different and identifying code. The time difference which is observed and used by the UE to decide whether it is in the requested area is the difference—with respect to the time of arrival at the UE—between the a transmission from the base station of the serving cell and the transmission from a PE. The measurements can be used to estimate the UE distance to the Pc's.

The invention claimed is:

1. A base station transmitter and at least one mobile user equipment, the base station transmitter being for use in a wireless telecommunications network for transmitting messages to the at least one user equipment,
    the base station transmitter transmitting a paging message on a paging channel to page the at least one mobile user equipment, the message including a representation of a geographical area from which the paged mobile user equipment can determine whether its present position is within the geographical area,
    the mobile user equipment comprising:
    an antenna for receiving a paging message from the base station transmitter;
    means for determining the present location of the user equipment and means for determining whether the present location of the user equipment is within a defined geographical area; and
    means to transmit an access request to the base station transmitter, and the means to transmit an access request to the wireless telecommunications network transmitting the request in response to the determination.

2. The base station transmitter and at least one mobile user equipment according to claim 1, wherein the paging message includes a further part containing information relevant to the geographical area.

3. A method of operating a base station transmitter and at least one mobile user equipment, the base station transmitter being for use in a wireless telecommunications network for transmitting to at least one user equipment, the method comprising the steps of:
    the base station transmitter transmitting a paging message to page the at least one at least one mobile user equipment, the message including a representation from which the at least one mobile user equipment can determine whether its present position is within a geographical area, the paging message being transmitted on a paging channel, the at least one mobile user equipment receiving the paging message from the base station transmitter, the mobile user equipment determining whether the location of the at least one user equipment is within the defined geographical area; and
    the at least one mobile user equipment transmitting an access request to the wireless telecommunications network in response to the determination.

4. A base station transmitter and at least one mobile user equipment according to claim 1 wherein the network is a cellular wireless network and the transmitter is in a cell and the geographical area is smaller than the cell of the network.

5. A base station transmitter and at least one mobile user equipment according to claim 1, wherein the representation comprises a definition of the geographical area.

6. The base station transmitter and at least one mobile user equipment according to claim 1, wherein the representation comprises a set of time data and references to radio transmitters of a set of radio transmitters.

7. The base station transmitter and at least one mobile user equipment according to claim 6, wherein the time data are time differences relating to pairs of radio transmitters.

8. The method according to claim 3, wherein the network is a cellular wireless network and the transmitter is in a cell and the geographical area is smaller than the cell of the network.

9. The method according to claim 3, wherein the representation comprises a definition of the geographical area.

10. The method according to claim 3, wherein the representation comprises a set of time data and references to radio transmitters of a set of radio transmitters.

11. The method according to claim 3, wherein the time data are time differences relating to pairs of radio transmitters.

* * * * *